US006827566B1

(12) United States Patent
Root et al.

(10) Patent No.: US 6,827,566 B1
(45) Date of Patent: Dec. 7, 2004

(54) SELF-LOCKING TIRE MOLD BLADE

(75) Inventors: Richard Root, East Amherst, NY (US); Gerald E. Hallberg, Jr., Buffalo, NY (US); Pierre H. Noel, Lakeview, NY (US); Robert J. Boody, Alden, NY (US)

(73) Assignee: G.M. Root, Inc., Buffalo, NY (US)

( * ) Notice: Subject to any disclaimer, the term of this patent is extended or adjusted under 35 U.S.C. 154(b) by 183 days.

(21) Appl. No.: 10/337,929

(22) Filed: Jan. 7, 2003

Related U.S. Application Data

(60) Provisional application No. 60/346,444, filed on Jan. 7, 2002.

(51) Int. Cl.[7] ............................ B29D 30/06; B23P 11/00
(52) U.S. Cl. ...................... 425/28.1; 29/509; 425/193; 425/472
(58) Field of Search .......................... 425/28.1, 35, 46, 425/193, 470, 472; 29/505, 509

(56) References Cited

U.S. PATENT DOCUMENTS

| | | | |
|---|---|---|---|
| 2,224,337 A | | 12/1940 | Bostwick |
| 2,732,589 A | * | 1/1956 | Steadman ................... 425/28.1 |
| 2,736,924 A | * | 3/1956 | Bean .......................... 425/28.1 |
| 3,553,790 A | | 1/1971 | Brobeck et al. |
| 6,264,453 B1 | | 7/2001 | Jacobs et al. |

FOREIGN PATENT DOCUMENTS

| | | |
|---|---|---|
| DE | 1169651 | 5/1964 |
| DE | 19749565 C1 | 3/1999 |
| DE | 19913436 C1 | 12/2000 |
| JP | 10258429 | 9/1998 |
| WO | WO 03002334 | 1/2003 |

* cited by examiner

*Primary Examiner*—James P. Mackey
(74) *Attorney, Agent, or Firm*—James C. Simmons

(57) ABSTRACT

A blade for use in a tire mold, a combination of the blade with the tire mold, and a method of attaching the blade to the tire mold. An edge portion of the blade is received in a slot in the tire mold, and a body portion extends therefrom to form a sipe in a tire. One or a pair of tab portions attached to the edge portion is received in an indent in the slot, and a wedge forces the tab portion or portions into a locked position as the blade is driven into the slot. A break-away tendon or tendons attach the wedge to the tab portion or portions and break to allow wedge movement for achieving the locked position when the blade is driven into the slot. Alternatively, a wedge is pre-positioned in an housing in the indent whereby blade tab portions move into a locked position upon contact with the wedge. The mold is engraved, and the blade is formed by laser or water jet cutting.

22 Claims, 18 Drawing Sheets

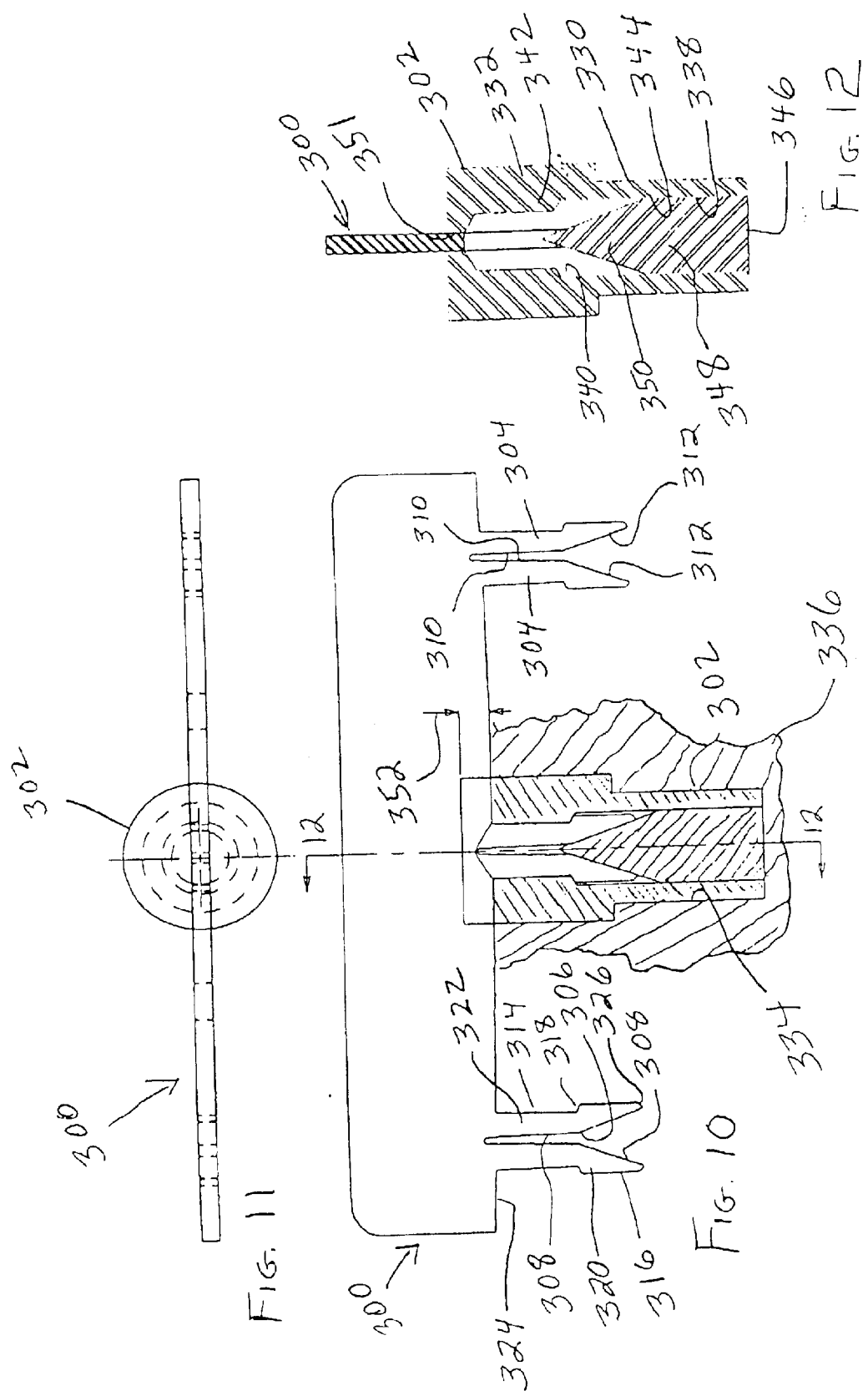

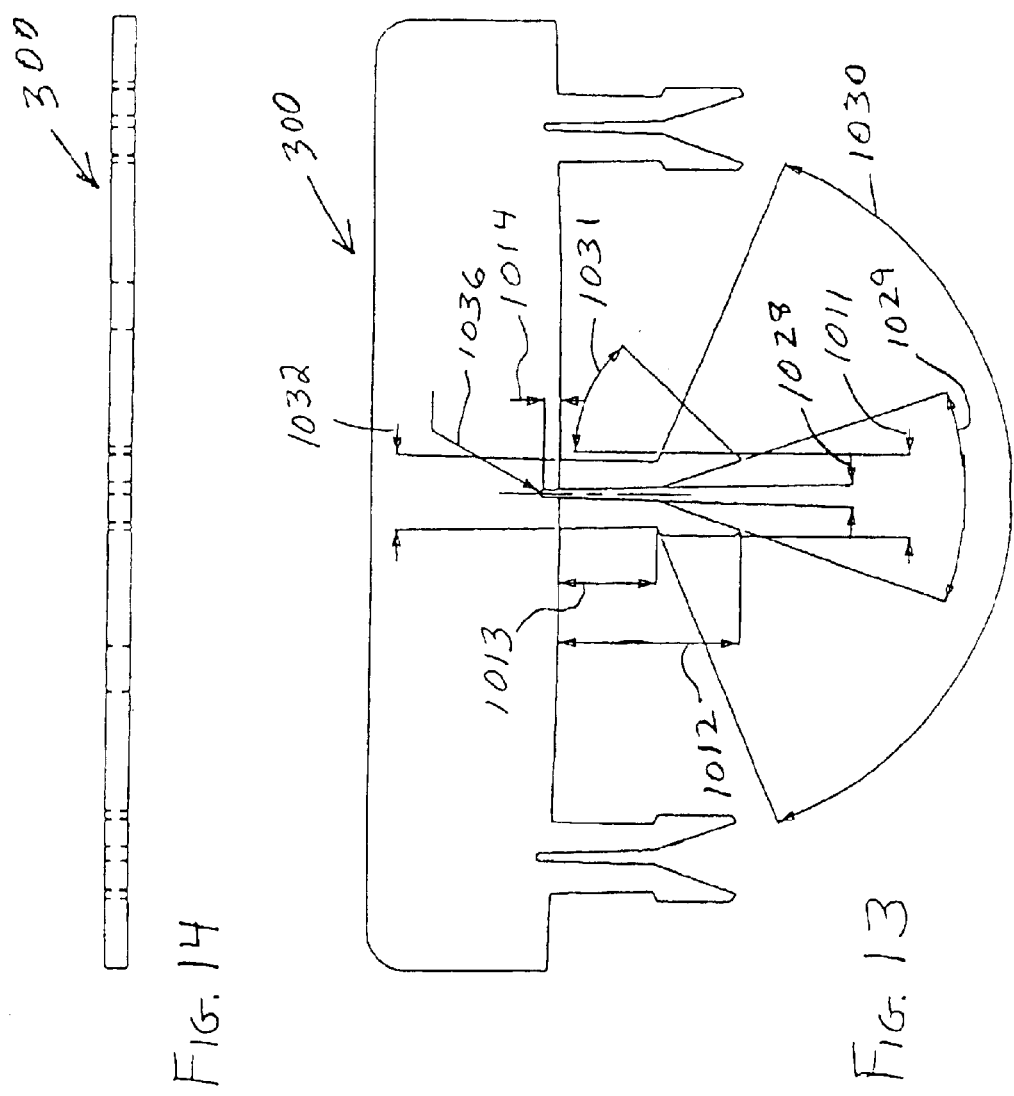

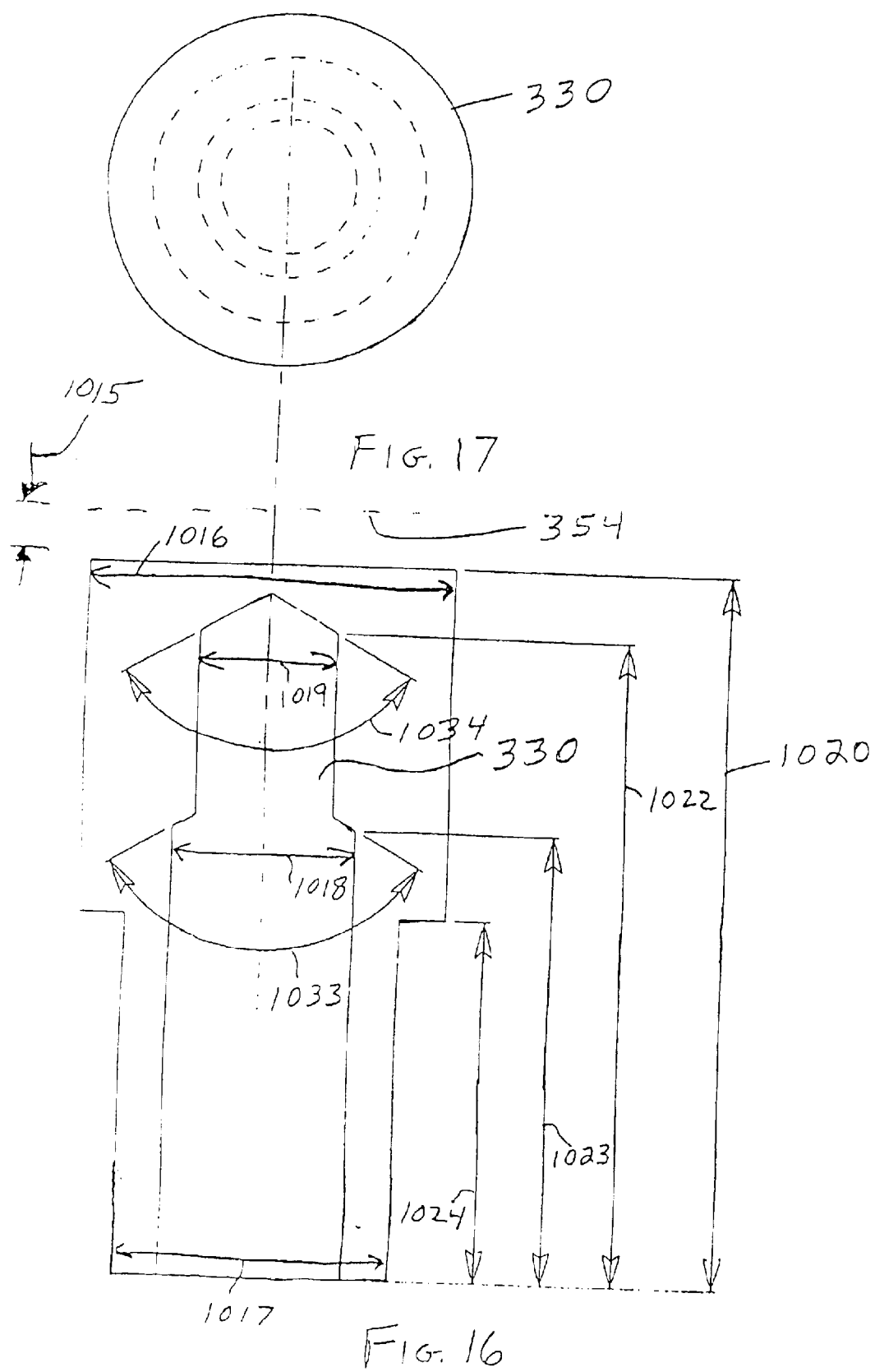

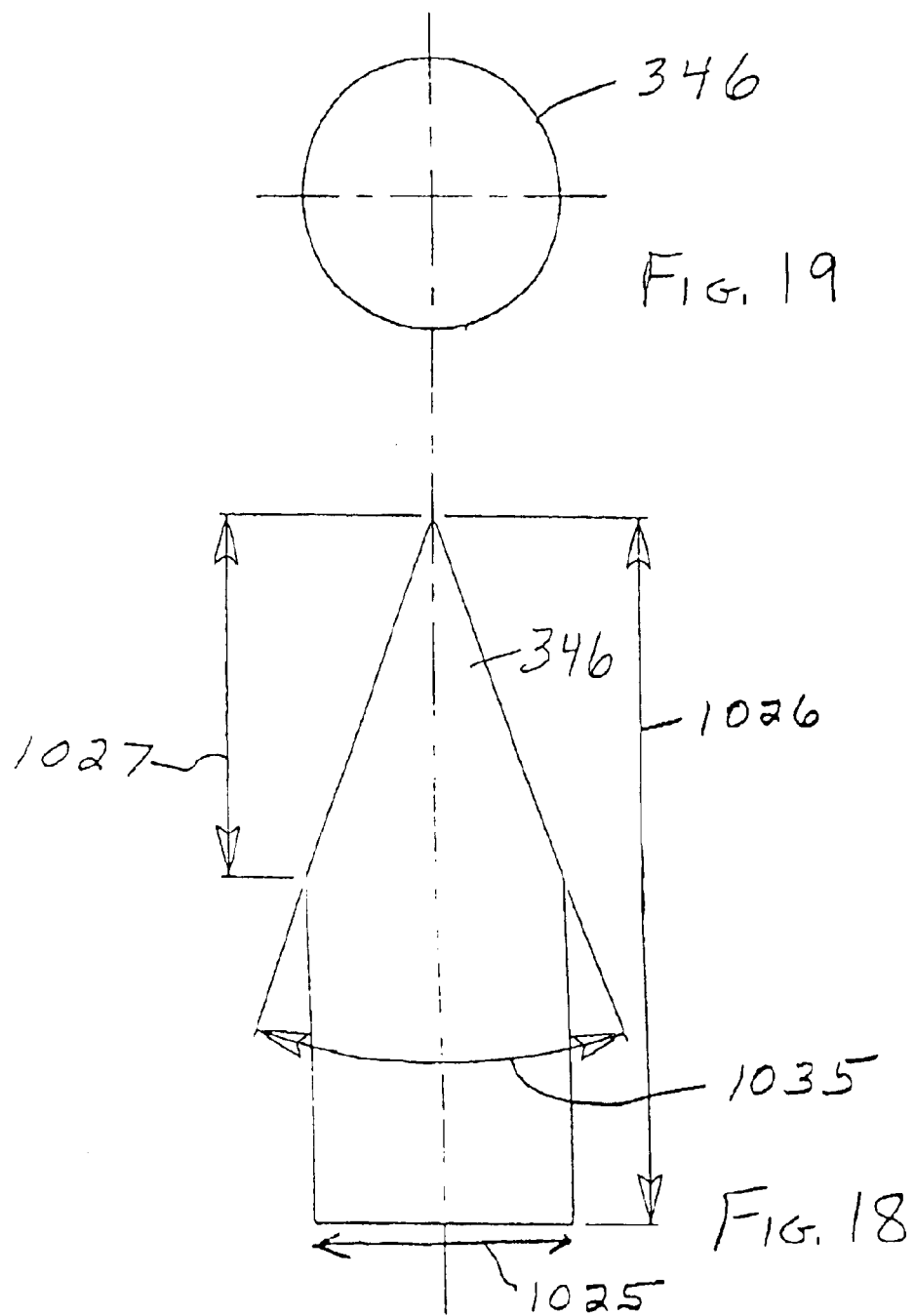

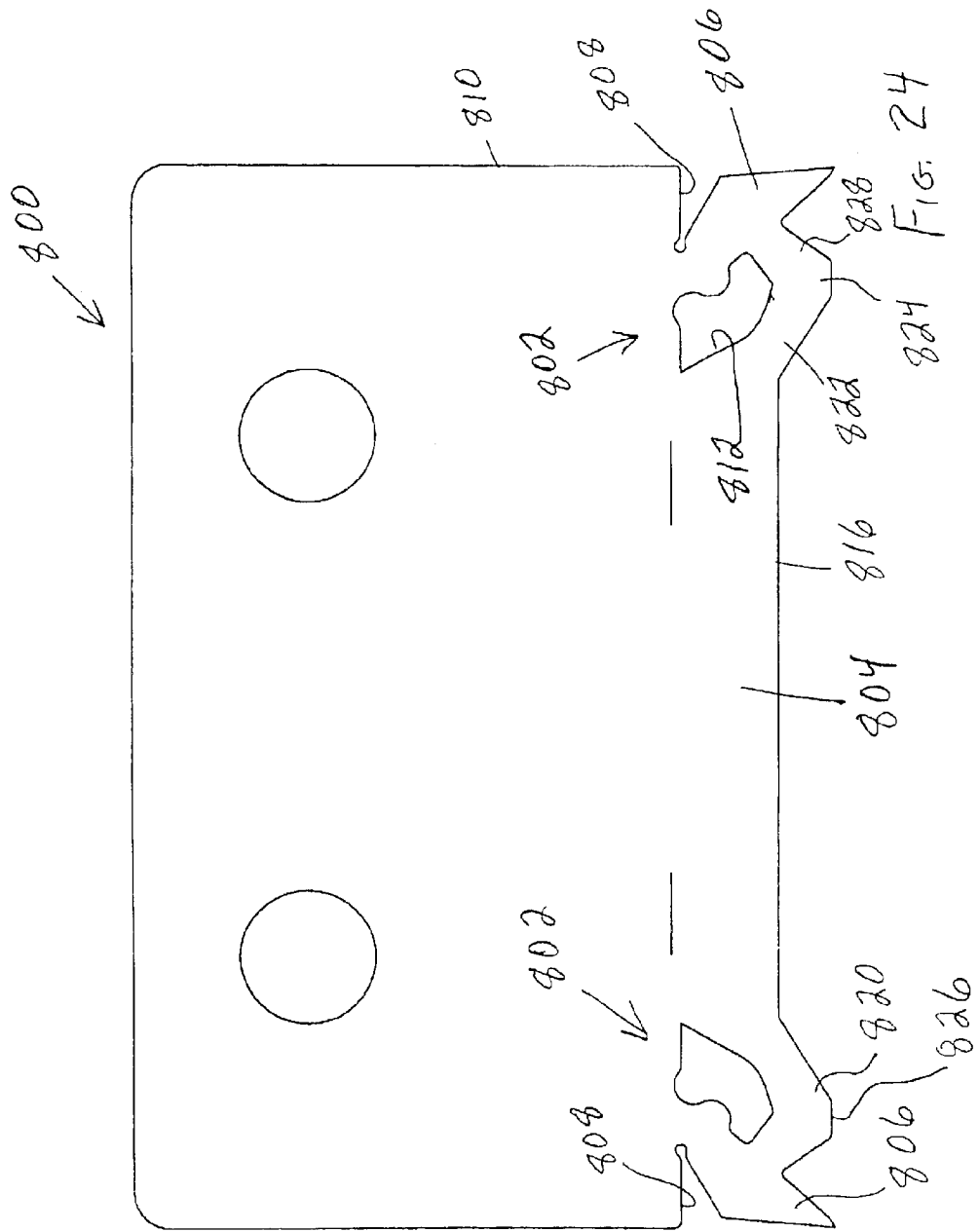

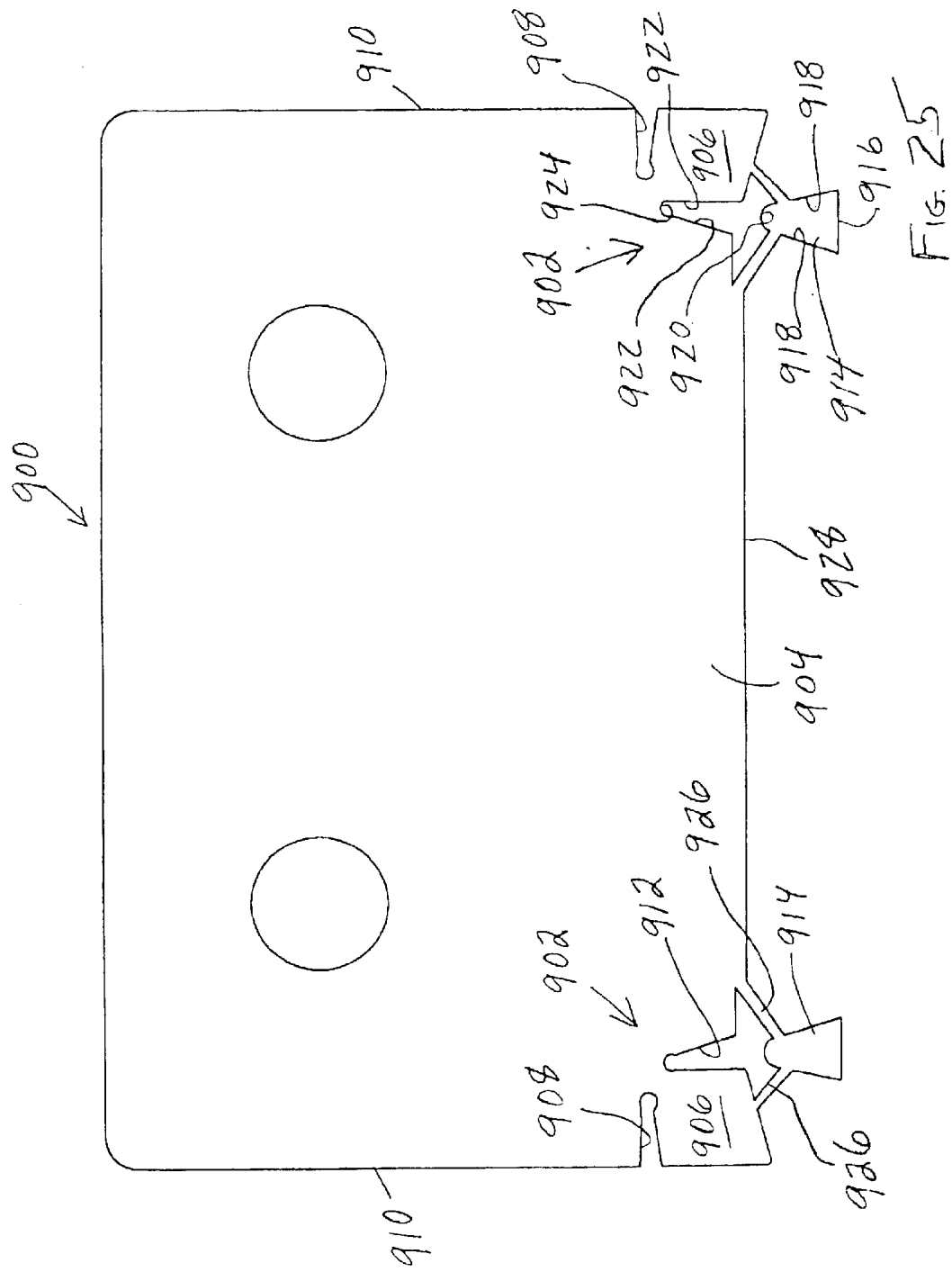

SELF-LOCKING TIRE MOLD BLADE

Priority of U.S. provisional patent application 60/346,444, filed Jan. 7, 2002, the disclosure of which is incorporated herein by reference, is hereby claimed.

The present invention relates generally to the art of molding tires. More particularly, the present invention relates to blades which are inserted in slots in tire molds for forming sipes, i.e., short narrow grooves in the tread of a tire. Illustrations of various forms of blades are found in U.S. Pat. No. 6,264,453, the disclosure of which is hereby incorporated herein by reference.

Recently, the tire industry has begun to convert from an aluminum cast process for molding tires to the use of engraved steel or aluminum molds. Engraving is considered desirable to provide a more accurate tire, and state of the art 5-axis machines make engraving economical.

Short thin slots are engraved into the tire mold for insertion of blades, which have an elongate edge portion or base received in the slot and a body or operative portion which extends from the slot to form the sipe during the molding of the tire tread. The slot depth may typically be about 0.190 inch.

Blades are typically about ¼ to 2 inches long and made from a running length or strip of metallic material such as steel, stainless steel, or inkanel. The strip is generally about 0.02 to 0.04 inch thick and has a width of about ½ to 1½ inches (which define the thickness and height respectively of the blade). The strip may be in solid form or perforated.

An epoxy has been used to hold the blades within the slots, to withstand a force in the range of several hundred pounds.

However, the blades tend to fail and come loose after a short time (perhaps 2 years). Moreover, it is difficult and time consuming to use the epoxy to install the blades.

A conventional slot for a tire mold blade has a depth across its entire length of about 0.190 inch, requiring a substantial amount of machining.

It is accordingly an object of the present invention to provide a means for attaching a blade so that it can withstand the forces typically encountered by blades for a long period of time.

It is another object of the present invention to easily and quickly insert the blades.

It is a further object of the present invention to reduce the amount of tire mold machining for blade insertion and therefor reduce the machining cost.

In order to easily and quickly attach a blade to a tire mold so that it lasts a long time, in accordance with the present invention, the blade is formed to have at least one self-locking portion which is receivable within a slot or slit in the mold wherein, as the blade is tapped with the self-locking portion partially in the slot or slit, a wedge member forces at least one tab portion into a locking relation in the slot or slit as the self-locking portion is driven fully into the slot or slit.

The above and other objects, features, and advantages of the present invention will be apparent in the following detailed description of the preferred embodiment of the invention when read in conjunction with the accompanying drawings wherein the same reference numerals depict the same or similar parts throughout the several views.

BRIEF DESCRIPTION OF THE DRAWINGS

FIG. 1A is a sectional view thereof taken along lines 1A—1A of FIG. 1.

FIG. 1C is a diagrammatic illustration of a portion of the blade.

FIG. 10 is a sectional view of an assembly of a blade and a wedge and wedge housing for one of three pairs of tabs in an assembled form in accordance with another embodiment of the present invention.

FIG. 11 is a top view of the assembly of FIG. 10.

FIG. 12 is a sectional view thereof taken along lines 12—12 of FIG. 10.

FIG. 13 is a plan view of the blade of FIG. 10, showing various dimensions thereof.

FIG. 14 is an upper edge view of the blade of FIG. 10.

FIG. 15 is a side edge view of the blade of FIG. 10.

FIG. 16 is a side elevation view of the wedge housing, showing various dimensions thereof.

FIG. 17 is a top view of the wedge housing, showing various dimensions thereof.

FIG. 18 is a side elevation view of the wedge for the assembly of FIG. 10, showing various dimensions thereof.

FIG. 19 is a top view of the wedge for the assembly of FIG. 10.

FIGS. 20 to 25 are plan views of blades in accordance with other alternative embodiments of the present invention.

DETAILED DESCRIPTION OF THE PREFERRED EMBODIMENT

Figure 1:
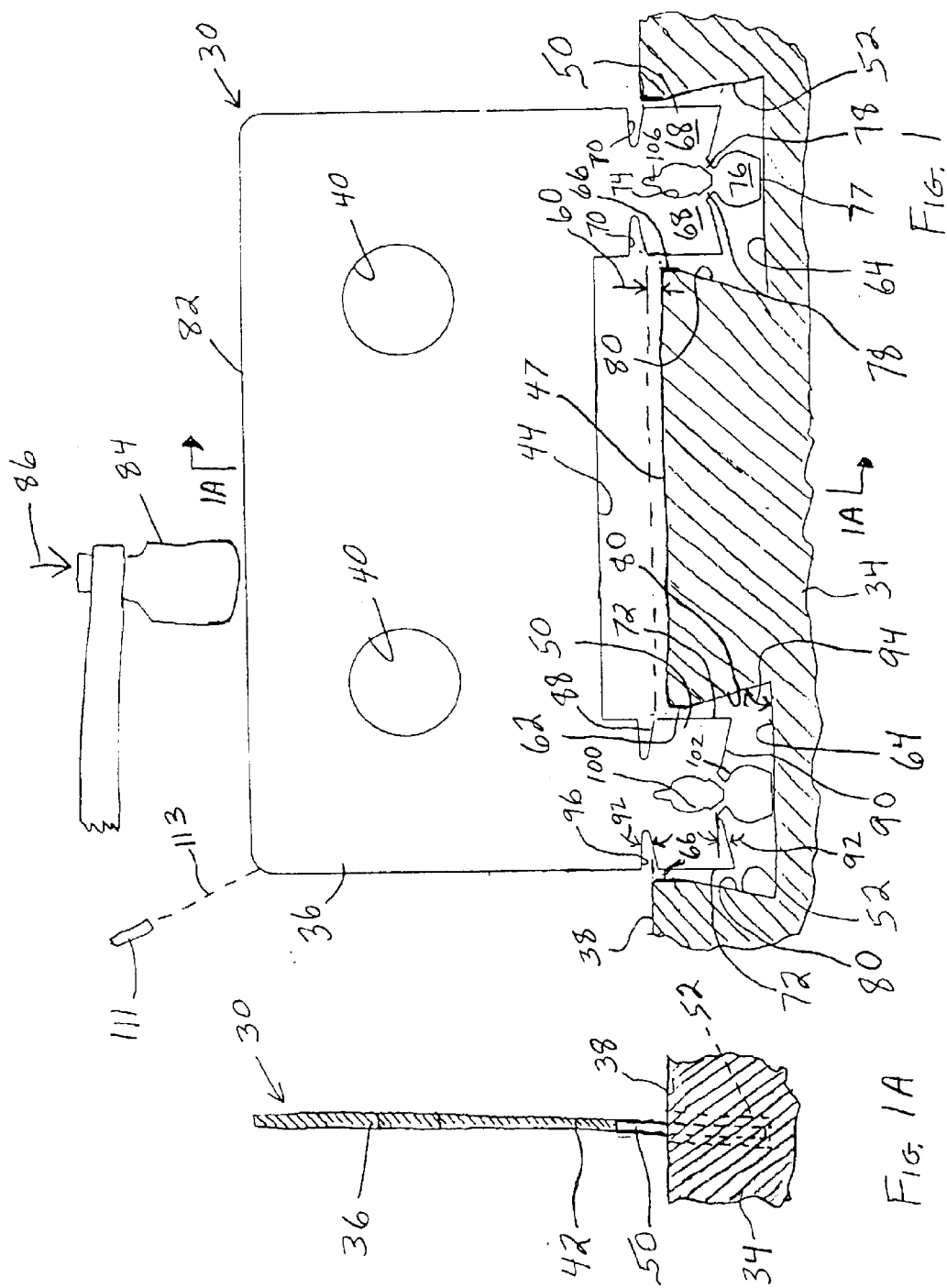
FIG. 1 is a sectional view of a portion of a tire mold with a blade being attached thereto in accordance with the present invention.

Referring to FIG. 1, there is shown generally at 30 a blade which is a thin metallic member which is attached to a tire mold 34, as hereinafter described, so that an operative or body portion, illustrated at 36, extends above the surface 38 of the mold 34 to form a sipe in the tire to be molded by use of the mold 34. The mold 34 may be formed of steel which is engraved by the use of 5-axis machines, using principles commonly known to those of ordinary skill in the art to which this invention pertains, or otherwise suitably formed. The blade 30 may be formed of steel, stainless steel, inkanel, or other suitable material in a manner as described hereinafter. The blade 30 has a thickness of, for example, about 0.02 to 0.04 inch. The two apertures illustrated at 40 in the blade body portion 36 are for test purposes. The blade body portion 36 may have any of various shapes and sizes as dictated by tire design, for example, as shown in the aforesaid U.S. Pat. No. 6,264,453.

In order to quickly and easily attach the blade 30 to the mold 34 so that it can withstand the forces typically encountered by blades for a long period of time (i.e., several years), the blade 30 has a pair of self-locking portions or structures, illustrated at 50, extending from the lower edge 44, the structures 44 preferably having the same thickness as the remainder of the blade 30. A blade 30 may contain only 1 or more than 2 such structures 50. Each structure 50 is received in a slot, illustrated at 52, in the surface of the mold 34.

Figure 2:
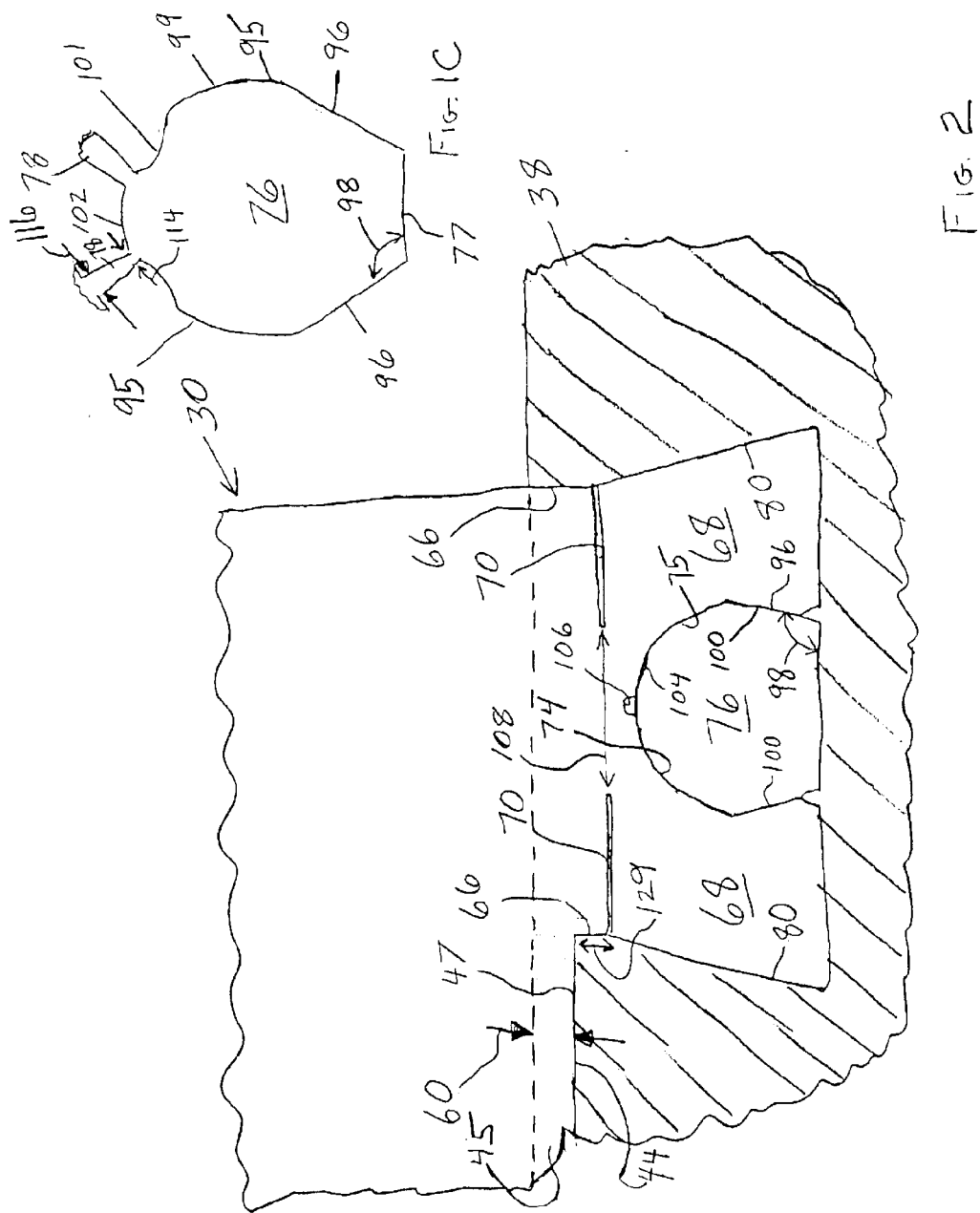
FIG. 2 is a partial enlarged view thereof, similar to the view of FIG. 1, illustrating a blade portion locked in a slot of the tire mold.

The blade body portion 36 has a lower edge 44 which is received in and rests on the bottom 47 of an elongate slit, illustrated at 45, in the mold surface 38 and extending between the slots 52 when the blade 30 is securely attached to the mold 34, as seen in FIG. 2. The depth, illustrated at 60, of the slit 45 is selected so as not to leave a space or air gap between the blade edge 44 and the slit bottom 47 where debris may otherwise get underneath the edge 44 and undesirably undermine the security of the blade attachment, perhaps causing the blade to be pulled out. This distance 60 may, for example, be about 0.015 inch.

Each slot 52 has an opening or mouth 62 at the level of the mold surface 38, and the slot floor 64, which is below the opening 62, is longer than the length of the opening 62, whereby the end walls 80 of the slot 52 taper outwardly or away from each other from the opening 62 to the slot floor 64. The length of the opening 62 is just enough to receive the structure 50, for example, the opening 62 may be of such a length that the structure 50 must be press fit into the slot 52. The upper ends of the sloping walls 80 are extended vertically instead of sloping, as illustrated at 66, in order to prevent material failure at what would otherwise be a point.

Each self-locking structure 50 includes a pair of tabs 68 defined by a pair of slits, illustrated at 70, in the end walls 72 thereof and an opening or cut-out, illustrated at 74, centrally between and below the slits 70, the upper extremity of the cut-out 74 being at or slightly below the height of the slits 70. It should be understood that a self-locking structure in accordance with the present invention may have only one such tab 68, as will be described hereinafter with respect to FIGS. 6 to 9. Below the cut-out 74 is a wedge member 76 which is held to the tabs 68 by a pair of easily breakable thin elongate members or tendons 78 (which should nevertheless be strong enough to withstand normal handling prior to insertion of the structure 50 in the respective slot 52).

With the flat bottom surface 77 of the wedge 76 resting squarely on the floor 64 of the slot 52, by tapping the blade upper edge 82 with a hammer 84, as illustrated by arrow 86, the tabs 68 are forced downwardly against the wedge 76, breaking the tendons 78, and forcing movement relatively of the wedge 76 into the cut-out 74, as illustrated in FIG. 2. As the wedge 76, which has a greater width than that of the cut-out 74 prior to such insertion, is inserted into the cut-out 74, it wedgingly causes the tabs 68 to spread apart thereby filling in the area vertically below the sloped walls 80, whereby the blade may be quickly and easily self-locked in the slots 52. As seen in FIG. 2, as long as the wedge remains within the now-enlarged cut-out 74, the blade 30 is restrained from detachment from the slot 52.

The upper and lower edges 88 and 90 respectively of each tab 68 are preferably parallel and are each inclined downwardly at an angle, illustrated at 92 in FIG. 1, with the horizontal which is substantially equal to the angle, illustrated at 94 in FIG. 1, which the corresponding wall 80 of the slot 52 makes with the slot floor 64, the upper edge 96 of each slit 70 being generally horizontal. This allows the tabs 68, when they are spread by insertion of the wedge 76, to substantially close the slits 70 and fill the space adjacent the inclined walls 80, with the lower edges 90 of the tabs 68 becoming horizontal to rest squarely on the floor 64, as seen in FIG. 2. Thus, as long as the wedge 76 is inserted between the tabs 68, the blade 30 is restrained from pulling out of the slot 52.

As previously stated, the wedge 76 has a lower surface 77 which is flat so as to prevent rotation of the wedge 76 as it is inserted between the tabs, the flat surface 77 being horizontal (i.e., parallel or complementary with the slot floor 64) both before and after the above describing locking action, as seen in FIGS. 1 and 2 respectively. Extending upwardly from each end of the lower wedge surface 77 to the respective tendon 78 is a wall 95. A generally rounded (i.e., convex or dome-shaped) upper surface 102 of the wedge 76 connects the upper ends of the wall portions 96 thereof and is receivable in a complementarily shaped surface 104 of the cut-out 74 when the wedge 76 is fully received in the respective cut-out 74. The rounded surface 102 seeks or locates against a radiused or rounded bearing surface 110, of each tab 68 so as to ensure smooth mechanical motion as the wedge is received in the cut-out and to locate the wedge 76 on center.

Each wall 95 comprises wall portions 96, 99, and 101. Each wall portion 96 slopes upwardly from the respective end of the lower wedge surface 77, the wall portions 96 diverging from each other as they slope upwardly, each at an angle illustrated at 98. This angle 98 is substantially the same as the angle at which a respective sloping lower inner wall portion 100 of the respective tab 68 extends when the wedge 76 is fully received in the respective cut-out 74 whereby the wedge wall portions 96 become flush with the tab wall portions 100 over the lengths thereof. Wall portion 101, which connects to a respective tendon 78 is concave (reversed radius) shaped to allow room (space) for the material of the respective tendon 78 when it is broken off. Wall portion 99 is centrally located between the wall portions 96 and 101 and is radiused to be convex to fit the complementary shape of the corresponding portion 75 of the respective tab 68.

A vertical slit, illustrated at 106, with a rounded terminal end is formed centrally in the upper surface of the cut-out 74 and generally just below the locations of the slits 70 in order to aid spreading of the tabs 68 to form the surface 104 so as to be complementary to the corresponding wedge surface. The distance, illustrated at 108, should be sufficient to provide sufficient strength in the blade portion between the slits 70 to withstand a desired minimum force applied to the blade 30 to attempt to pull it out of the slots 52, i.e., to withstand a predetermined amount of force acting to separate the blade body 36 from the tabs 68. As a result, the wedge 76 and cut-out 74 are formed to provide complementary surfaces so that the wedge 76 fully fills the space between the tabs 68 when the wedge 76 is fully inserted between the tabs 68, as seen in FIG. 2. The widest point of the wedge 76 squeezes between the lower portions of the tabs 68 gradually as they spread apart (with some material deformity to permit such insertion) so as to provide a very tight fit with no play, wherein the lower ends of the tabs 68 may be said to "wrap around" or partially "encapsulate" the wedge to prevent its removal from between the tabs.

The smallest width, illustrated at 114, of each tendon 78 is at its intersection with the wedge 76, i.e., the width 114 is less than the width 116 at the intersection of the tendon 78 and respective tab 68. This lesser width 114 is provided to control the breakage of the tendons 78 so that they break at the intersection thereof with the wedge 76 in order that they break inward to prevent interference with the wedge movement as well as to fill any void.

The size of the tendons 78 is such that the blade 30 cannot be easily machined with the wedge 76 attached using conventional machining processes. In order to form the blade with the wedge 76 intactly held to thereto by the tendons 78, in accordance with the present invention, the blade 30 is preferably formed by cutting with a laser beam, i.e., laser cutting, as illustrated in FIG. 1 by laser cutter 111 emitting laser cutting beam 113 in accordance with any suitable conventional laser cutting procedure, which process is well known to those of ordinary skill in the art to which this invention pertains. Alternatively, the blade 30 may be formed by cutting with a water jet, which is also a process well known to those of ordinary skill in the art to which this invention pertains.

Figure 3:
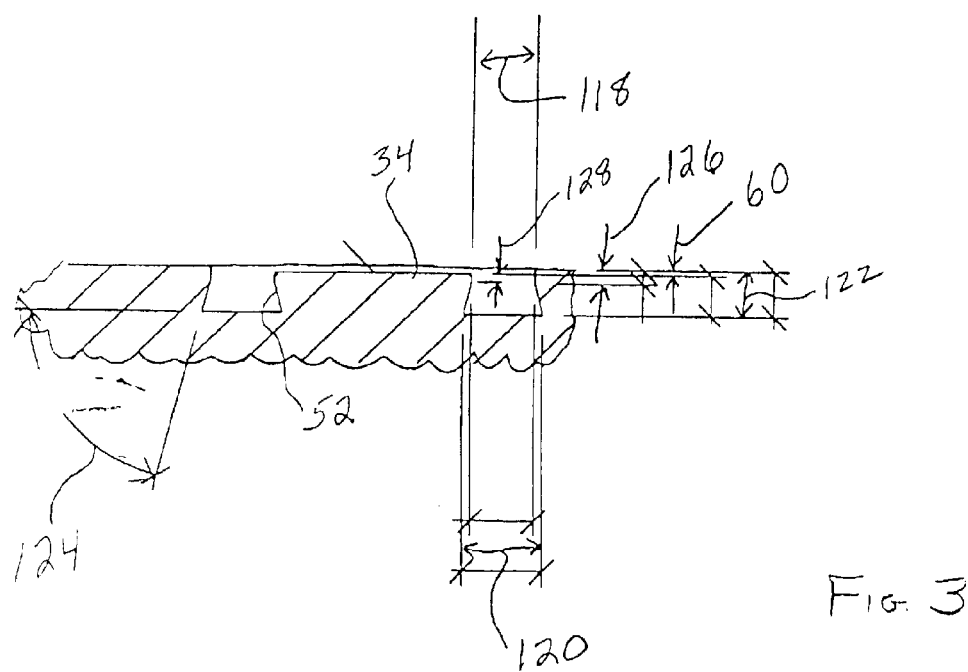
FIG. 3 is a view of the tire mold portion which is similar to the view thereof in FIG. 1, showing various dimensions thereof.
Figure 4:
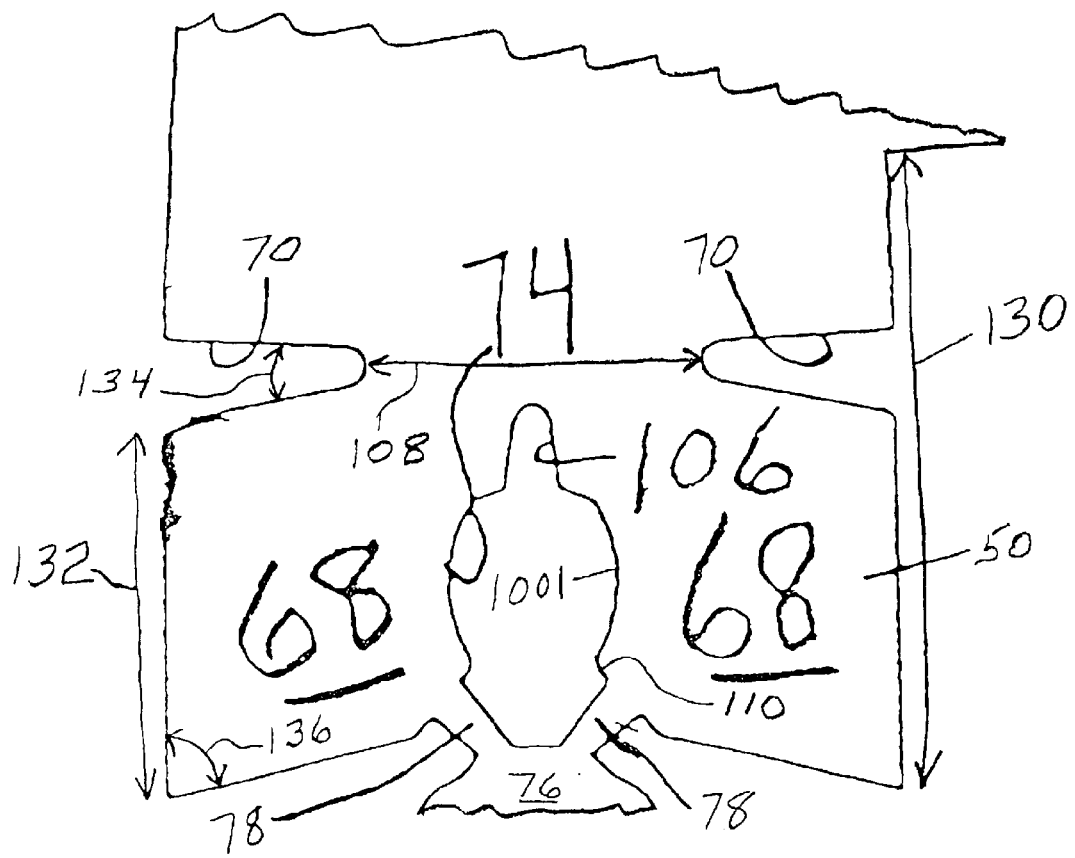
FIG. 4 is a view of tabs of one of the blade self-locking structures which is similar to the view thereof in FIG. 1, showing various dimensions thereof.
Figure 5:
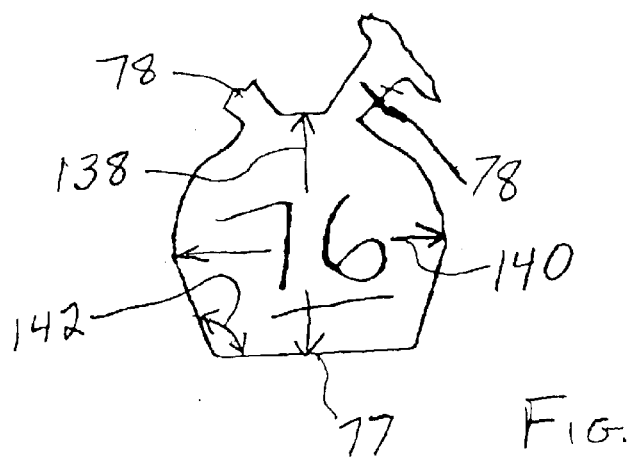
FIG. 5 is a view of a wedge of one of the blade self-locking structures which is similar to the view thereof in FIG. 1, showing various dimensions thereof.

Referring to FIGS. 3 to 5, the following exemplary dimensions of the blade and mold of FIGS. 1 to 2 are for illustrative purposes only and not for purposes of limitation. The blade 30 may have a thickness of about 0.030 inch and a length of about 1 inch and is composed of steel, and the mold is composed of aluminum or steel. Each slot 52 has an opening width, illustrated at 118, which is about 0.196 inch and a floor width, illustrated at 120, which is about 0.247 inch. The slot depth, illustrated at 122, is about 0.140 inch, with the slit 45 between the slots 52 having a depth 60 of about 0.015 inch. Thus, the amount of machining required is reduced as compared to that required for a typical conventional slot which has a depth across its entire length of about 0.190 inch so that the cost of machining for insertion of a blade is advantageously reduced. The slot side walls are slanted at an angle, illustrated at 124, of about 75 degrees, and the outer ones of the walls extend straight up (not slanted) over a distance, illustrated at 126, of about 0.045 inch, the inner ones of the walls extend straight up (not slanted) over a distance, illustrated at 128, of about 0.03 inch. The distance, illustrated at 129, is about 0.045 inch.

The overall height, illustrated at 130, of each self-locking structure 50 is about 0.165 inch, and the height, illustrated at 132, of each tab 68 is about 0.098 inch. The angle, illustrated at 134, formed by each slit 70 is about 13.741 degrees, and the angle, illustrated at 136, which the lower wall of each tab makes with the side wall thereof is about 77 degrees. The surface 1001 (FIG. 4) is radiused at about 0.036 inch. The tab bearing surface 110 is radiused at about 0.006 inch. The angle 1002 and the distances 1003, 1004, and 1005 may, for example, be about 75 degrees, 0.014 inch, 0.125 inch, and 0.045 inch respectively. The overall wedge height and width, illustrated at 138 and 140 respectively, are about 0.061 inch and 0.074 inch respectively. Each wedge surface 96 slopes outwardly from the wedge lower surface 77 at an angle, illustrated at 142, of about 110.690 degrees. The surfaces 99, 101, and 102 of the wedge are radiused at 0.037 inch, 0.025 inch, and 0.035 inch respectively (the radius of surface 99 being such as to complement or fit the inside radius of about 0.036 inch of the tab surface 75). The distance 108 between the slits 70 is about 0.091 inch. The thicknesses 114 and 116 at opposite ends of each tendon 78 are about 0.009 inch and 0.012 inch respectively, and each tendon 78 has a length of about 0.020 inch.

Figure 6:
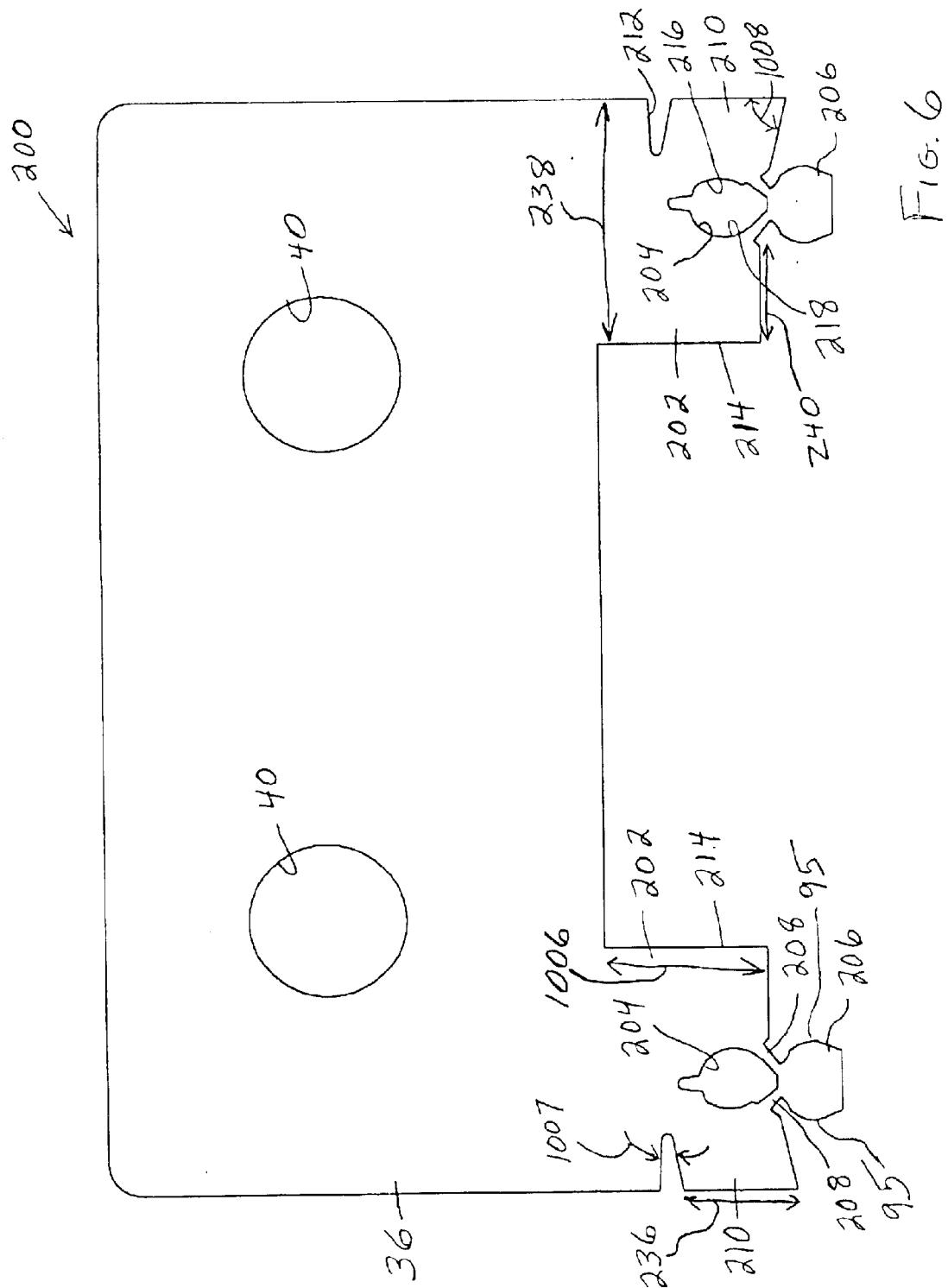
FIG. 6 is a plan view of a blade in accordance with an alternative embodiment of the present invention.
Figure 7:
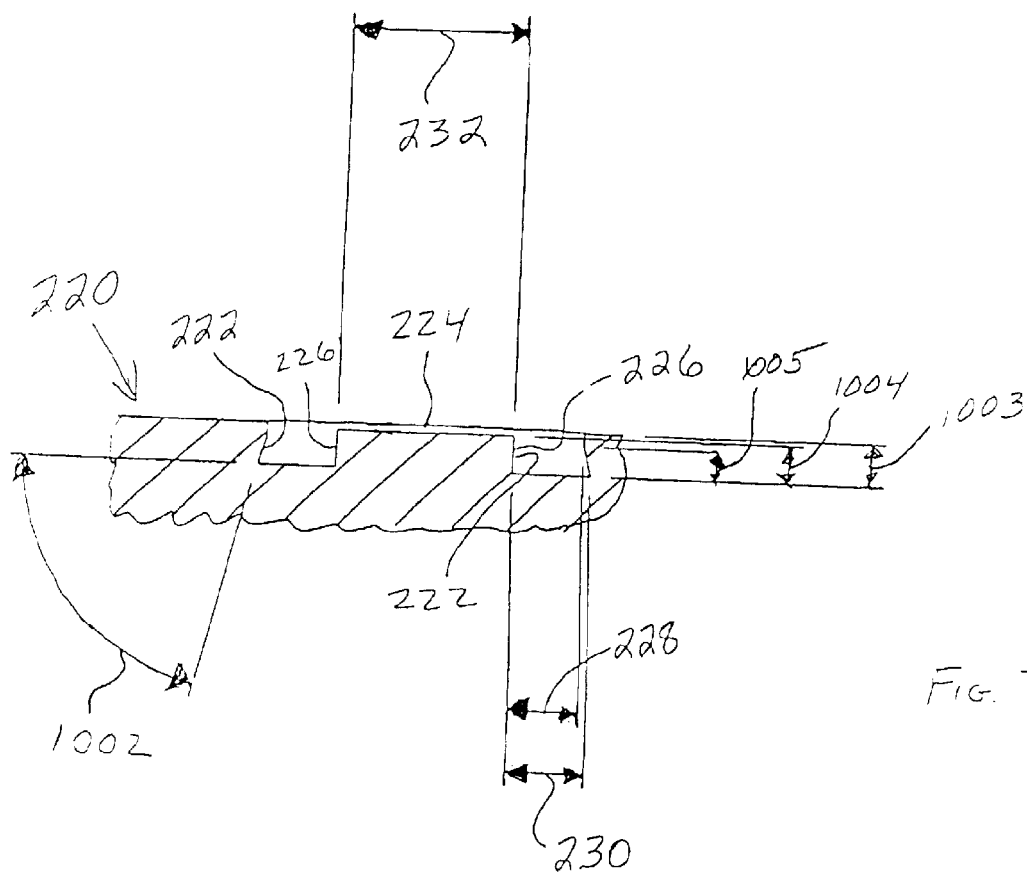
FIG. 7 is a sectional view of a portion of a mold for the blade of FIG. 6.

Referring to FIGS. 6 to 9, there is shown generally at 200 a blade in accordance with an alternative embodiment of the present invention. Similarly to the embodiment of FIGS. 1 to 5, the blade 200 includes a pair of self-locking structures 202 each having a cut-out, illustrated at 204, and a wedge 206 connected to the structure 202 by a pair of tendons 208, all similar to the corresponding parts of blade 30, except as described hereinafter. FIG. 7 illustrates generally at 220 a tire mold portion for receiving the blade 200 and including a pair of slots, illustrated at 222, for receiving the structures 202 and a slit, illustrated at 224, extending between the slots 222, all similar to the corresponding features of tire mold portion 34, except as described hereinafter.

Near a rib or other obstructing tire mold feature, it may be difficult to engrave a sloping slot sidewall similar to sidewall 80. In order to cope with such an obstruction, the self-locking structure 202 is formed to have only one tab 210, which is similar to tabs 68, and a corresponding slit, illustrated at 212, similar to slit 70, whereby the opposite side of the structure 202 may be straight (vertical and not sloping, as shown at 214) and the corresponding side wall 226 in the mold 220 may similarly be straight, as shown in FIG. 7, so that it may be more easily formed when a rib or other obstructing tire mold feature is in the way.

While the tab-side surface, illustrated at 216, of the cut-out 204 is formed to receive the corresponding surface 95 of the wedge when the tab 210 is spread, the surface, illustrated at 218, on the other side of the cut-out 204 is generally uniformly radiused, for example, at a radius of 0.033 inch, to accommodate the corresponding wedge surface 95 without spreading.

Figure 8:
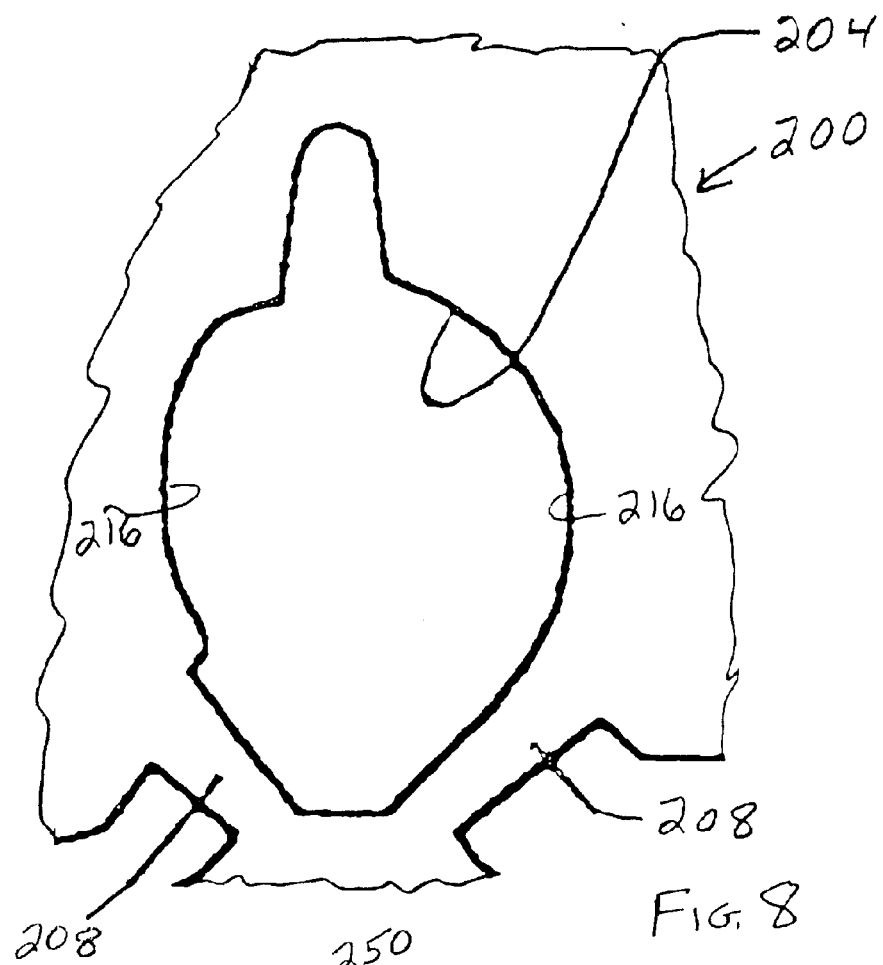
FIG. 8 is a view similar to that of FIG. 4 of tabs of one of the blade self-locking structures for the blade of FIG. 6, showing various dimensions thereof.
Figure 9:
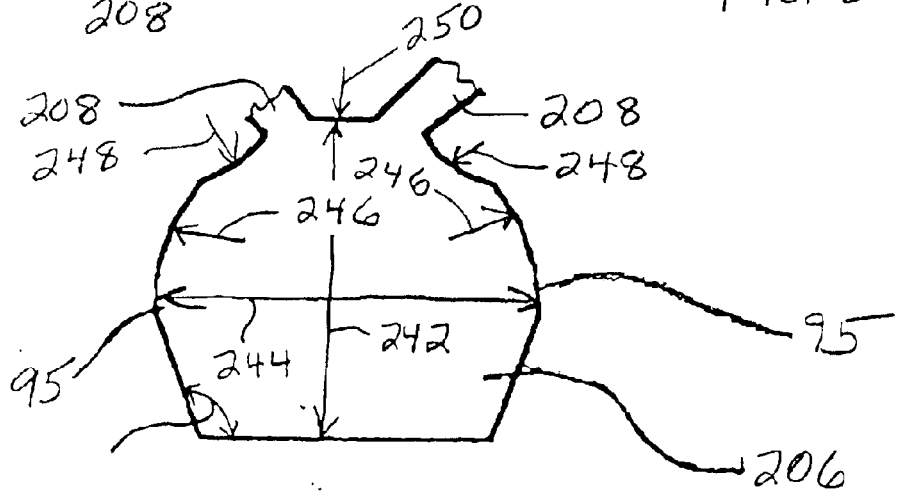
FIG. 9 is a view similar to that of FIG. 5 of a wedge of one of the blade self-locking structures for the blade of FIG. 6, showing various dimensions thereof.

Referring to FIGS. 7 to 9, the following exemplary dimensions of the blade and mold of FIGS. 6 and 7 are for illustrative purposes only and not for purposes of limitation. The composition and dimensions thereof may, for example, be similar to those of the blade and mold of FIGS. 1 and 2, except as follows. The mouth and floor widths, illustrated at 228 and 230 respectively, of each slot 222 may be about 0.221 inch and 0.247 inch respectively. The distance, illustrated at 232, between the slots 222 may be about 0.556 inch. The height, illustrated at 234, of the structure 202 may be about 0.125 inch, and the height, illustrated at 236 (FIG. 6), of the tab 210 may be about 0.103 inch. The overall width, illustrated at 238, may be about 0.222 inch, and the width, illustrated at 240, thereof from the straight wall 214 to the connecting tendon 208 may be about 0.086 inch. The height 1006 of the wall 214 may, for example, be about 0.125 inch. The angles 1007, 1008, and 1009 may, for example, be about 13.741, 77, and 110.69 degrees respectively. The overall height and width, illustrated at 242 and 244 respectively, of the wedge 206 may be about 0.059 inch and 0.070 inch respectively. The surfaces, illustrated at 246, 248, and 250, of the wedge 206 (which correspond to surfaces 99, 101, and 102 of the wedge 76) may be radiused at about 0.035 inch, 0.018 inch, and 0.035 inch respectively.

Referring to FIGS. 11 to 19, there is illustrated generally at 300 a blade and three self-locking assemblies 302 therefor in accordance with an alternative embodiment of the present invention. It should be understood that there may be one, two, or more than three such assemblies 302 for a blade.

For each assembly 302, the blade 300 has a pair of tabs or fingers 304 separated by a channel, illustrated at 306, which has walls 308 which are generally parallel over a majority of the depth thereof near the blade 300 to provide parallel wall portions 310 and which incline away from each other to the mouth or outlet to provide inclined wall portions 312. Each tab 304 has a first outer wall portion 314 which is generally parallel to wall portions 310 and runs vertically over generally the same height and a second outer wall portion 316 which is generally parallel to the first wall portion 314 and runs vertically over generally the same height as the inclined wall portions 312 and is disposed outwardly from the respective first wall portion 314. A short generally horizontal wall portion 318 (shown in FIG. 10 to slope downwardly slightly as it extends outwardly) extends between the lower end of the wall portion 314 and the upper end of the corresponding wall portion 316 thereby defining an overhang portion 320 which extends outwardly beyond the respective tab portion 322 which lies between the overhang portion 320 and the lower edge 324 of the blade 300. The lower ends of the tabs 304 are truncated, as shown at 326, so that they are not formed as sharp points. Each channel 306 extends slightly beyond the lower blade edge 324.

Each assembly 302 includes a generally cylindrical housing 330 which has an enlarged diameter upper portion 332 which is press fit in a complementary shaped bore, illustrated at 334, in the mold 336, i.e., it may have, for example, a 0.001 negative clearance with the bore 334 requiring that it be pounded into position with a hammer or the like or otherwise suitably attached within the mold bore 334 so that it suitably resists forces tending to pull it out of the bore 334. The housing 330 has a bore, illustrated at 338, the upper portion 340 of which is complementary in shape to that of the outer wall portions 314, 316, and 318 of the corresponding pair of tabs 304, i.e., the housing 330 has an upper inwardly overhanging portion 342. The lower portion 344 of the bore 338 extends downwardly to extend substantially beyond the lower ends 326 of the tabs 304.

Received within the bore 338 is a wedge or center pin 346 which has a lower portion 348 which has a diameter which is substantially equal to the diameter of the bore lower portion 344 so that it may seat snugly therein. The wedge 346 has a conical upper portion 350 the wall of which is inclined at about the same angle of inclination as that of the tab inclined walls 312.

In order to attach the blade 300 to the mold 336, the wedge 346 is received in the lower portion 344 of the housing bore 338 when the housing 330 is pounded into the mold bore 334. The respective pair of tabs 304 is inserted into the housing bore 338 and force applied by a hammer or the like whereupon the inclined wall portions 312 of the tabs 304 slide downwardly over the conical wedge portion 350, causing the tabs 304 to spread to cause the tab overhang portions 320 to "catch" or "lock" in place under the housing overhang portion 342 to restrain movement of the tabs 304 upwardly and out of the housing bore. The tabs 304 are held in this locked position, as illustrated in FIG. 10, by the wedge 346, which is itself restrained from movement by the tabs 304 and the bottom of the mold bore. The blade 300 is desirably seated in a slit 351 in the housing 330 a distance, illustrated at 352 in FIG. 10, of, for example, 0.050 inch.

As illustrated at 354 in FIG. 16, the height of the housing 330 may be increased by, for example, about 0.020 inch, then after the housing 330 is positioned within the mold bore, a layer of 0.020 inch taken off the mold surface, including the housing to provide a smooth even mold surface.

It should be understood that the housing 330 may be eliminated by machining a bore in the mold which is similar to the housing bore 338, the tabs and the wedge being received in this machined mold bore for attaching the blade to the mold.

For purposes of illustration and not limitation, the following are illustrative dimensions of the structure of FIGS. 10 to 19. For example, the distances 1010 through 1027 may be about 0.03, 0.114, 0.241, 0.13, 0.021, 0.02, 0.25, 0.188, 0.125, 0.093, 0.5, 0.432, 0.291, 0.23, 0.124, 0.343, and 0.174 inch respectively. The angles 1028 through 1035 may, for example, be about 3, 39, 136, 45, 2, 118, 90, and 39 degrees respectively. The radius at 1036 may, for example, be about 0.01 inch.

Figure 20:
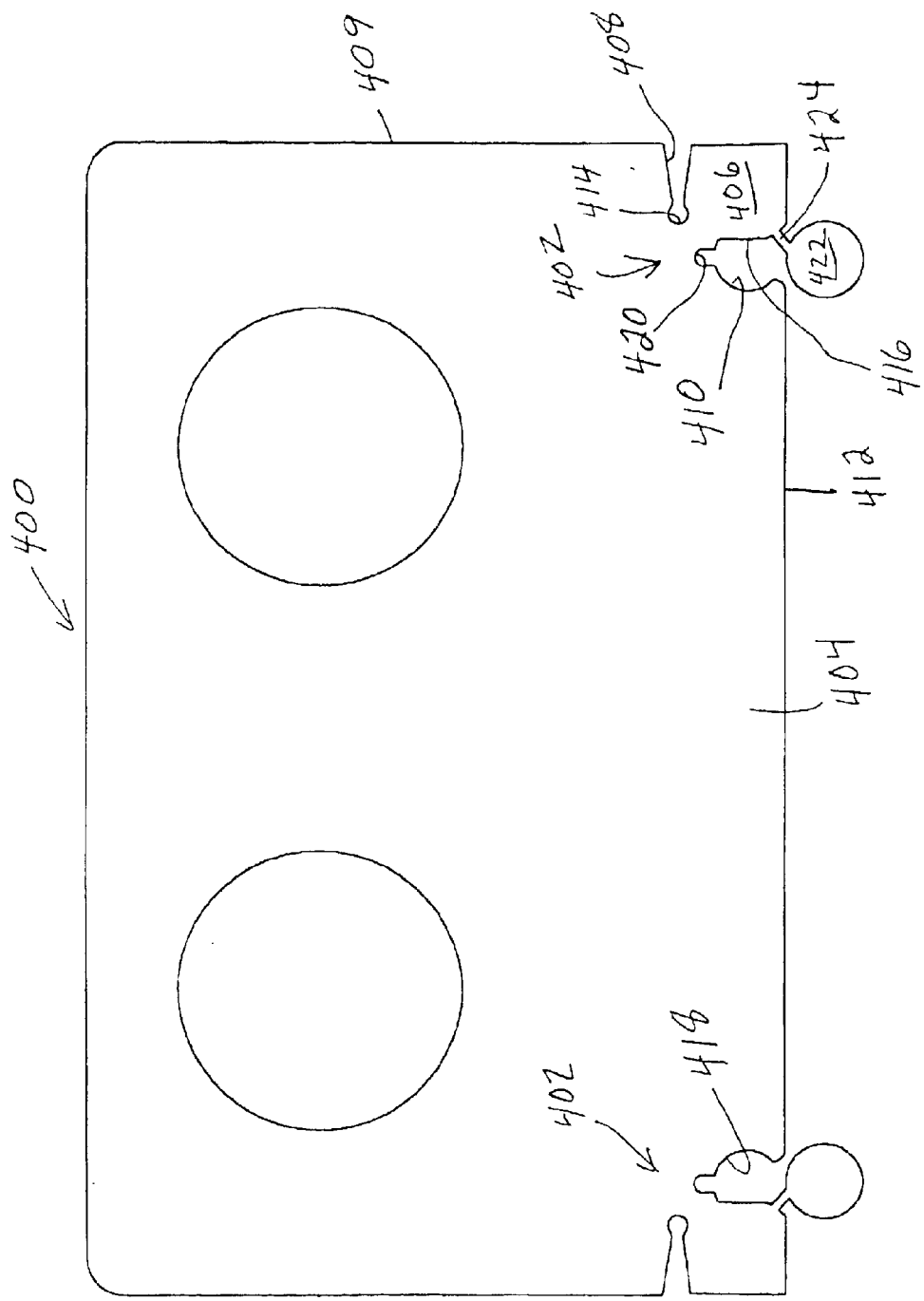

Referring to FIG. 20, there is shown generally at 400 a blade in accordance with another embodiment of the present invention. The blade 400 has a pair of self-locking structures 402, and its lower edge portion 404 is received in an elongate mold slit the length of which is equal substantially to the blade length and the depth of which is such as to receive the self-locking structure tab 406. The tab 406 is defined by a slit, illustrated at 408, in the blade side wall 409 and by a cut-out, illustrated at 410, in the bottom wall 412 of the blade. The bottom of the slit 408 has a generally circular shape, as illustrated at 414, to prevent metal failure, i.e., fracture or the like. The cut-out 410 has a generally vertical straight wall 416 defining a vertical wall of the tab 406, and its opposite wall 418 is generally arcuate. A slit, illustrated at 420, extends upwardly from an upper portion of the arcuate wall 418. The tab 406 is generally square in shape and is connected to the blade 400 by a portion which lies between the circular slit bottom 414 and the slit 420. A generally circular wedge 422 is connected to the blade 400 by a single tendon 424 which connects to the bottom of the tab 406 adjacent the cut-out 410. The wedge diameter is greater than the length of the mouth or opening of the cut-out 410.

As the blade 400 is tapped into the mold slit with a hammer or the like, the wedges 422 are forced into the cut-outs 410 respectively, breaking the tendons 424 and lockingly engaging the arcuate cut-out walls 418 and spreading the respective tabs 406 outwardly (with the slits 408 closing) to tightly impinge the ends of the slit in the mold to apply a desired amount of force to resist removal of the blade from the mold.

Figure 21:
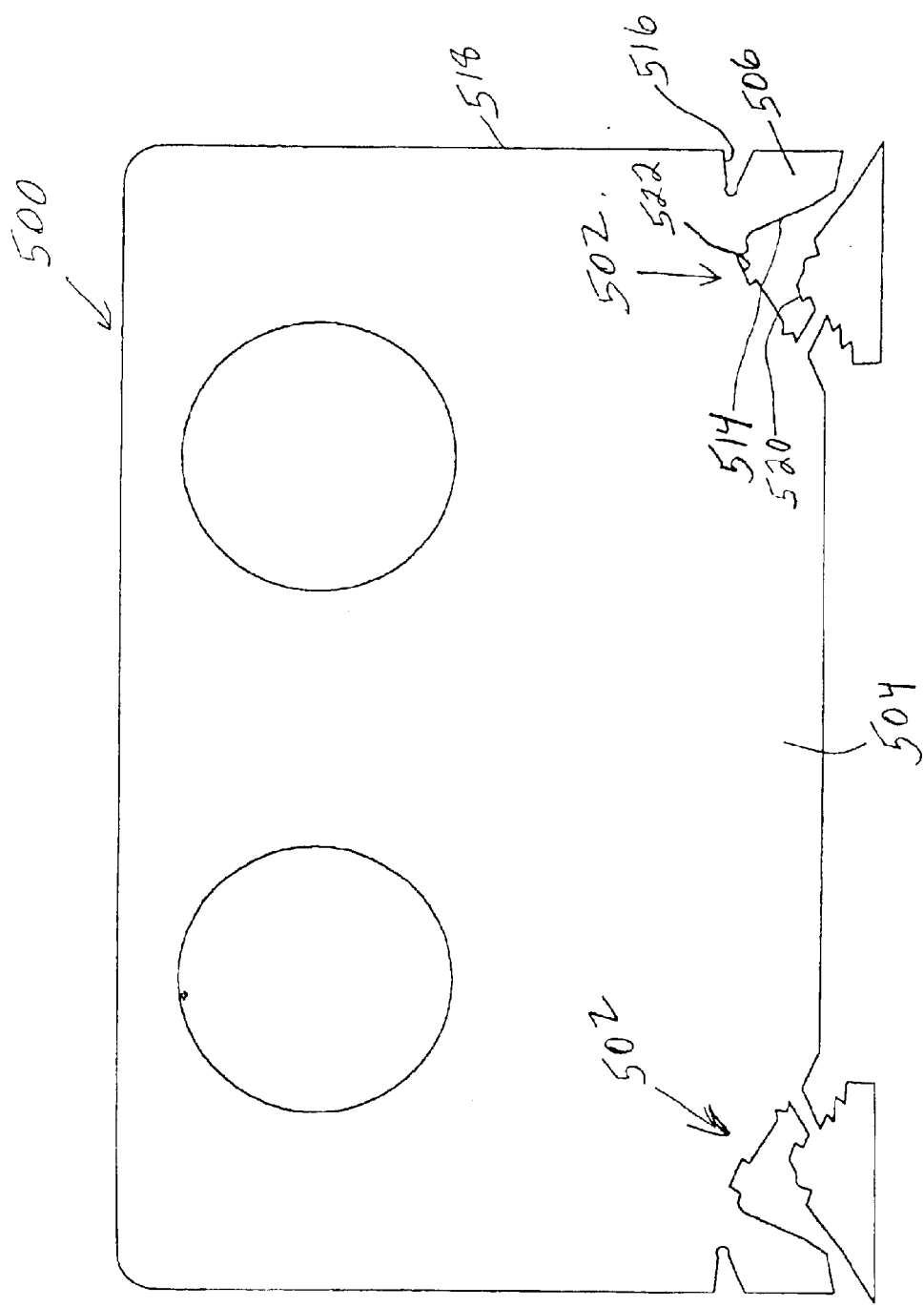

Referring to FIG. 21, there is shown generally at 500 a blade in accordance with still another embodiment of the present invention. The blade 500 has a pair of self-locking structures 502, and its lower edge portion 504 is received in an elongate mold slit the length of which is equal substantially to the blade length and the depth of which is such as to receive the self-locking structure tab 506. A wedge 508 is held to the blade 500 by a breakable tendon 510 to be received in cut-out 512. The tab 506 is defined by a wall 514 of the cut-out 512 and by a slit 516 in the respective side edge 518 of the blade 500. The wedge 508 is generally triangular in shape, and a protrusion 520 on one wall thereof engages a complementary shaped indent 522 in a wall of the cut-out 512 for lockingly receiving the wedge 508 in the cut-out 512. The blade 500 is lockingly received in the mold slit similarly as described for the blade 400, the tabs 506 being forced to tightly impinge the mold slit ends (with the slits 516 closing) as the wedges 508 are driven into the cut-outs 512.

Figure 22:
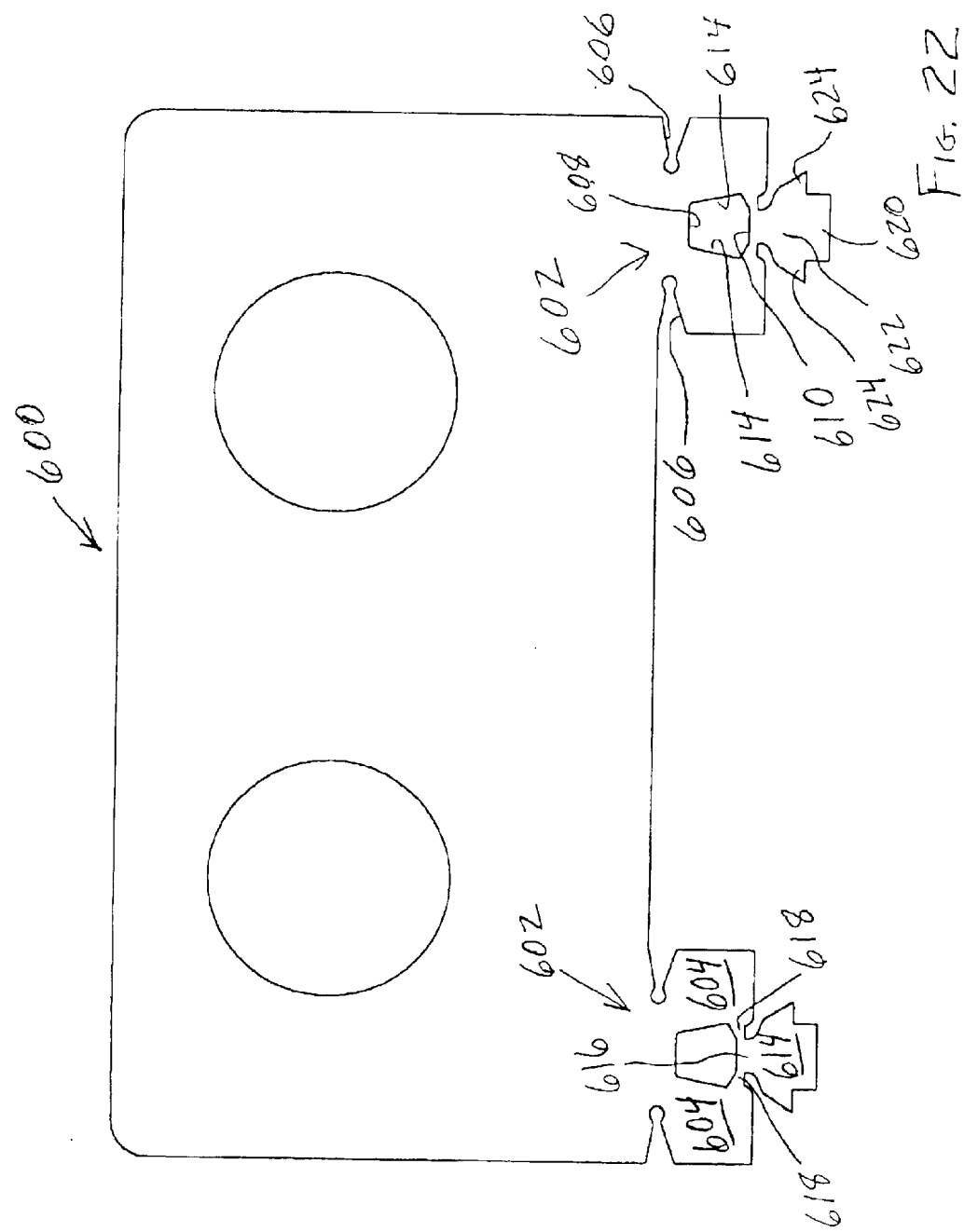

Referring to FIG. 22, there is shown generally at 600 a blade in accordance with still another embodiment of the present invention. The blade 600 has a pair of self-locking structures 602 which are received in respective slots in the mold, the length of each slot being substantially equal to the length of the respective structure 602. Each structure 602 includes a pair of tabs 604 defined by horizontally extending slits 606 respectively and by a centrally disposed generally trapezoidal shaped cut-out 608, the lower wall 610 thereof being longer than the upper wall 612 thereof thereby defining sloping side walls 614. A wedge 614 extends from a horizontal blade portion 616 which defines the lower cut-out wall 610, whereby the blade portion defines a pair of tendons 618 breakably holding the wedge 614 to the blade 600. The wedge 614 has a base portion 620 and a arrowhead shaped portion 622 defining a pair of overhanging portions 624. As the blade structures 602 are driven into the respective mold slots, the wedge 614 is forced into the cut-out 608, spreading the tabs 604 (and closing the space defined by the slits 606) to tightly impinge the mold slot end walls with a desired amount of force to restrain the blade's removal from the mold slots. The breakage of the tendons 618 leaves horizontal protrusions which are lockingly engaged by the wedge overhanging portions 624 to restrain the wedge 614 from removal from the cut-out 608.

Figure 23:
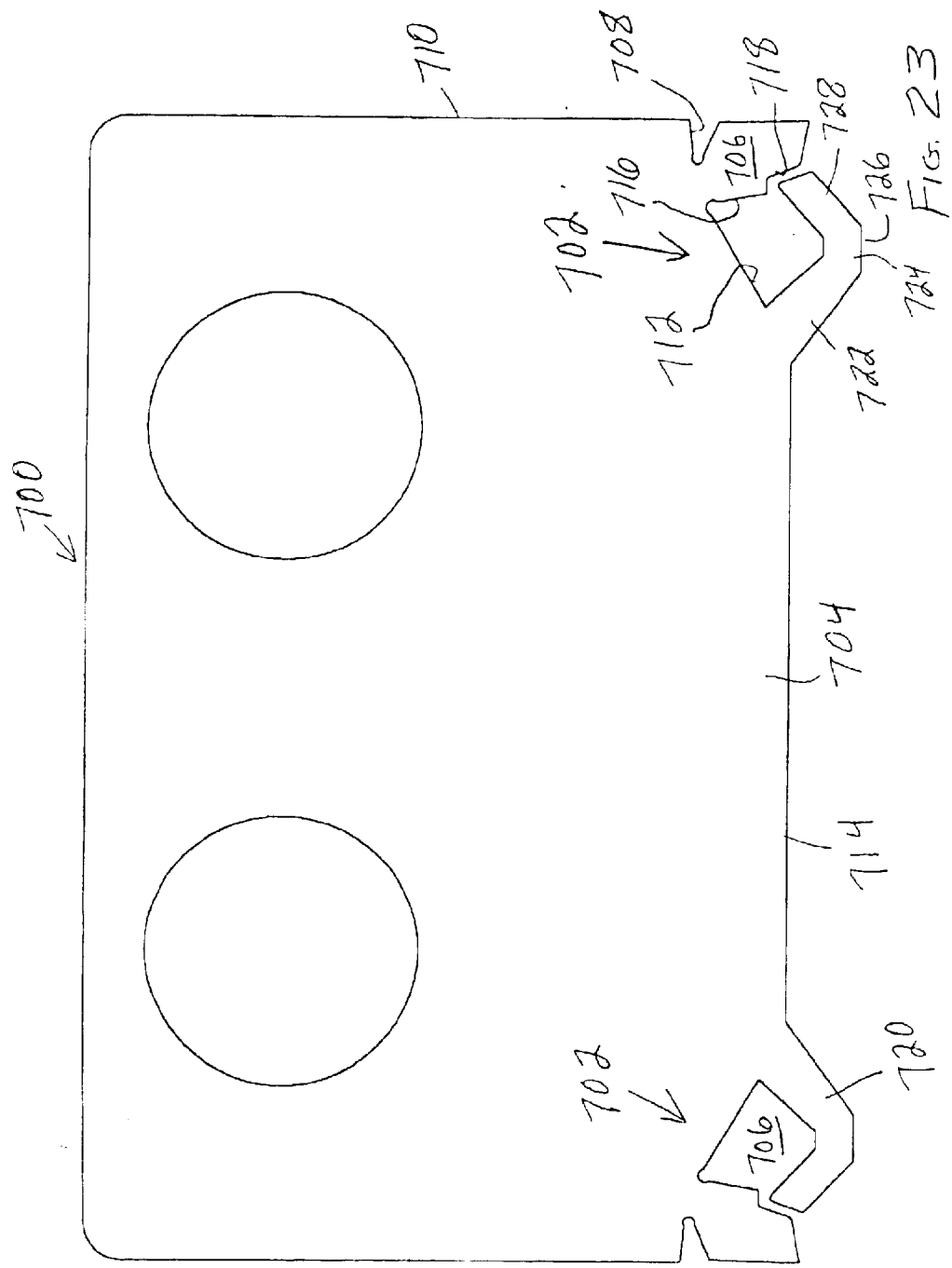

Referring to FIG. 23, there is shown generally at 700 a blade in accordance with yet another embodiment of the present invention. The blade 700 has a pair of self-locking structures 702 at opposite ends thereof, and its lower edge portion 704 is received in an elongate mold slit the length of which is equal substantially to the blade length and the depth of which is such as to receive the self-locking structure tab 706. The tab 706 is defined by a slit 708 in the blade side edge 710 and a generally triangular-shaped cut-out 712 in the lower edge 714 thereof. The cut-out wall 716 which partially defines the tab 706 has a notch 718 in the lower portion thereof. Extending from the lower blade edge 714 adjacent the cut-out 712 is a generally V-shaped portion 720 which has a first part 722 which extends downwardly and toward the respective tab 706, a second part 724 which extends horizontally for a very short distance to define a generally flat surface 726 which is below the blade lower edge 714 for engaging the bottom of the respective mold slot, and a third part 728 which extends upwardly and toward the tab 706 and terminates short of the notch 718. As the blade 700 is driven into the mold slit, the portions 720 are each forced toward a horizontally straight shape thereby engaging the notches 718 respectively to force the tabs 706 to tightly impinge the mold slit end walls (with the slits 708 closing) with an amount of force to restrain removal of the blade 700 from the mold slit.

Referring to FIG. 24, there is shown generally at 800 a blade in accordance with yet another embodiment of the present invention. The blade 800 has a pair of self-locking structures 802 at opposite ends thereof, and its lower edge portion 804 is received in an elongate mold slit the length of which is equal substantially to the blade length and the depth of which is such as to receive the self-locking structure tab 806. The tab 806 is defined by a slit 808 in the blade side edge 810 and a cut-out 812 in the lower portion 804 of the blade 800. Extending from the lower blade edge 816 adjacent the cut-out 812 is a generally V-shaped portion 820 which has a first part 822 which extends downwardly and toward the respective tab 806, a second part 824 which extends horizontally for a very short distance to define a generally flat surface 826 which is below the blade lower edge 816 for engaging the bottom of the respective mold slot, and a third part 828 which extends upwardly and toward the tab 806 and connects thereto, i.e., is integral therewith. As the blade 800 is driven into the mold slit, the portions 820 are each forced toward a horizontally straight shape to thereby force the tabs 806 to tightly impinge the mold slit end walls (with the slits 808 closing) with an amount of force to restrain removal of the blade 800 from the mold slit.

Referring to FIG. 25, there is shown generally at 900 a blade in accordance with still another embodiment of the present invention. The blade 900 has a pair of self-locking structures 902 at opposite ends thereof, and its lower edge portion 904 is received in an elongate mold slit the length of which is equal substantially to the blade length and the depth of which is such as to receive the self-locking structure tab 906. The tab 906 is defined by a slit 908 in the blade side edge 910 and a cut-out 912 in the lower portion 904 of the blade 900. A wedge 914 has a flat bottom wall 916 and a pair of side walls 918 which incline from the bottom wall 916 toward each other and terminate in a rounded top surface 920. The cut-out 912 has a pair of inclined side walls 922 and a rounded top surface 924 for receiving the wedge inclined walls 918. The wedge 914 is attached to the blade 900 by a pair of breakable tendons 926 one of which extends from the tab 906 and the other of which extends from the lower blade edge 928, the tendons 926 partially defining the cut-out 912. As the blade 900 is driven into the mold slit, the wedges 914 are forced into the respective cut-outs 912 (breaking the tendons 926) to thereby force the tabs 906 to tightly impinge the mold slit end walls (with the slits 908 closing) with an amount of force to restrain removal of the blade 900 from the mold slit.

Figure 27:
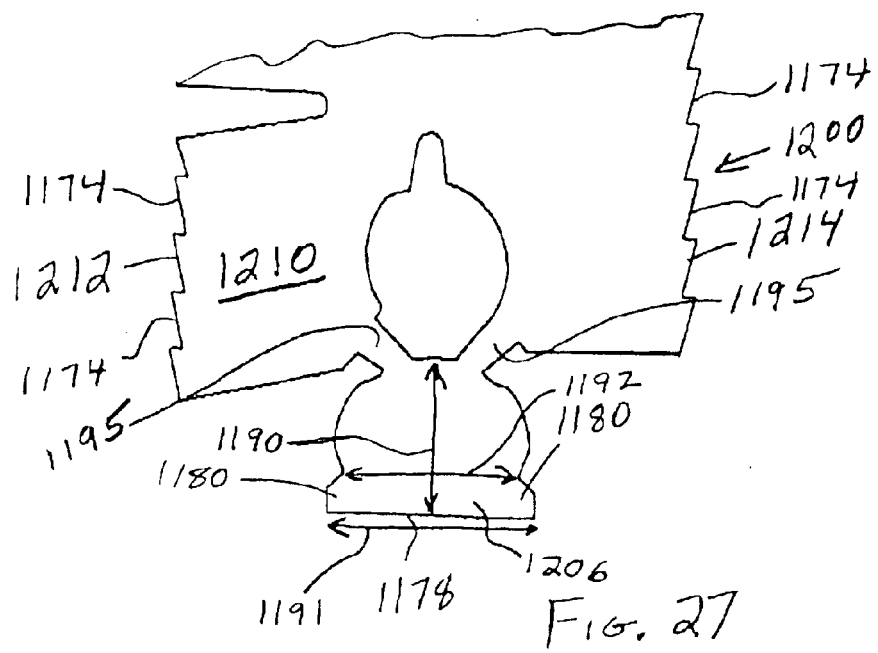
FIG. 27 is a plan view of a double tab blade portion in accordance with another alternative embodiment of the present invention.
Figure 26:
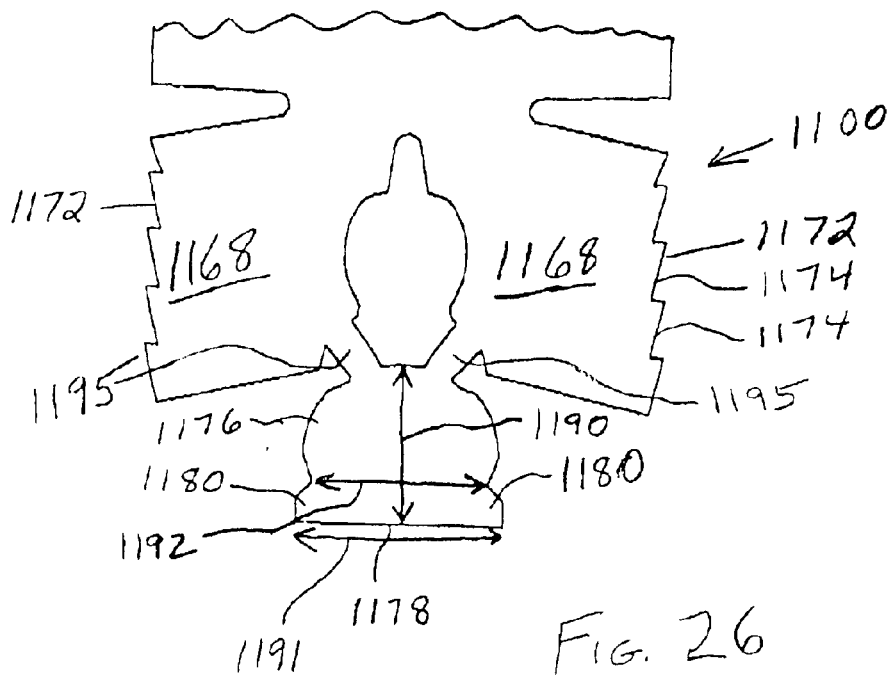
FIG. 26 is a plan view of a single tab blade portion in accordance with another alternative embodiment of the present invention.

The double-tab and single-tab blades 1100 and 1200 respectively shown in FIGS. 26 and 27 respectively are similar to blades 30 and 200 respectively, except as discussed herein. Each of the end walls of tabs 1168 of blade 1100 (as well as the end wall 1212 of single tab 1210 and the wall 1214 of blade 1200) is serrated, i.e., it has a plurality of serrations, illustrated at 1174, over its length in order to provide increased resistance, i.e., holding strength. In addition, each of the wedges 1176 and 1206 is provided with outwardly flared corner portions 1180 at the bottom surface 1178 to order to provide improved resistance to the wedge embedding in the slot floor 64. For purposes of illustration and not for limitation, the following are exemplary dimensions for the blades 1100 and 1200. The overall wedge height and width, illustrated at 1190 and 1191 respectively, are, for example, about 0.063 and 0.079 inch respectively. The distance 1192 is, for example, about 0.074 inch. The thicknesses of the break-off tendons 1195 are increased by about 0.003 to 0.004 inch from the thicknesses described hereinbefore for tendons 78 so that the wedge is more secure during tumbling.

It is thus seen that the present invention has a multitude of embodiments as typified by the number of different embodiments described and shown herein, and each of these embodiments is meant to come within the scope of the present invention. While the blades of each of the embodiments are provided for self-locking to prevent blade removal, it will require a greater amount of force to remove the blade in some embodiments than in other embodiments. However, the embodiment of FIGS. 1 to 5 has most satisfactorily exhibited suitable restraint to blade removal so that the blade may advantageously remain securely attached to the mold for a number of years, resisting forces of several hundred pounds to blade removal.

It should be understood that, while the present invention has been described in detail herein and in many different embodiments, the invention can be embodied otherwise without departing from the principles thereof, and such other embodiments are meant to come within the scope of the present invention as defined by the appended claims.

What is claimed is:

1. A blade for use in a tire mold, the blade comprising a member having an edge portion shaped to be received in a slot in a tire mold, a body portion extending from said edge portion and shaped to form a sipe in a tire, and at least one structure including at least one tab portion attached to said edge portion and shaped to be received in an indent in the slot and a wedge member shaped for forcing said at least one tab portion into a locked position as the blade is driven into the slot.

2. A blade according to claim 1 wherein the blade is laser or water jet cut.

3. A blade according to claim 1 wherein said structure further includes a tendon connecting said wedge member to said tab portion and allowing movement of said wedge member into a position to force said tab portion into said locked position.

4. A blade according to claim 3 wherein the blade is laser or water jet cut.

5. A blade according to claim 3 wherein said tendon has a point of least thickness at an intersection of said tendon with said wedge member to provide controlled breakage of said tendon at the intersection of said tendon with said wedge member as said wedge member is moved into the position to force said tab portion into said locked position.

6. A blade according to claim 1 wherein said structure further includes an other portion attached to said edge portion, said tab and other portions each having an outer wall for engaging corresponding walls of the indent, a slit in each of said outer walls and defining a boundary between each of said tab and other portions and said blade edge portion, a cut-out between said tab and other portions, said wedge member shaped to have a greater width than a cut-out width prior to movement of said wedge member into the cut-out and to be receivable within the cut-out to force said tab and other portions against the corresponding walls of the indent.

7. A blade according to claim 6 wherein said other portion is a second tab portion.

8. A blade according to claim 6 wherein said structure further includes at least one tendon connecting said wedge member to at least one of said tab and other portions and sized to allow movement of said wedge member into the cut-out as the blade is driven into the slot to force said tab portion to spread away from said other portion and into said locked position.

9. A blade according to claim 8 wherein said tendon has a point of least thickness at an intersection of said tendon with said wedge member to provide controlled breakage of said tendon at the intersection of said tendon with said wedge member so that the tendon breaks inward so as not to interfere with movement of said wedge member into the cut-out.

10. A blade according to claim 8 wherein said wedge portion has a flat surface for engaging a floor of the indent and convex upper wall portions and wherein each of said tab and other portions having a rounded surface which is complementary to said convex wedge wall portions and positioned for bearing of said convex wedge wall portions against said rounded surfaces respectively as said wedge portion is received in the cut-out.

11. A blade according to claim 10 wherein said wedge member further has flared corners at said flat floor-engaging surface of said wedge member.

12. A blade according to claim 10 wherein said wedge portion further has a pair of lower wall portions which slope outwardly from each other as they extend upwardly to said convex upper wall portions respectively, lower surfaces on said tab and other portions which are complementary to said lower wall portions respectively, each of said lower wall portions forming an angle with said flat floor-engaging surface of said wedge member which is substantially equal to an angle formed by said respective tab and other portion lower surface when said wedge portion is received between said tab and other portions whereby said lower wall portions are flush with said lower wall portions when said wedge portion is received between said tab and other portions.

13. A blade according to claim 12 wherein said wedge portion further has a vertical slit centrally in its upper surface to aid spreading of said tab and other portions.

14. A blade according to claim 6 wherein at least one of said tab and other portions has a serrated edge for engaging a wall of the indent.

15. A blade for use in a tire mold, the blade comprising a member having a body portion shaped to form a sipe in a tire, an edge portion, and at least one means for self-lockingly receiving said edge portion in a slot in a tire mold, said receiving means including at least one tab portion attached to said edge portion and shaped to be received in an indent in the slot and means for forcing said tab portion into a locked position as the blade is driven into the slot.

16. In combination with a tire mold having at least one slot and at least one indent in the slot, a blade comprising a member having an edge portion received in the slot, a body portion extending from said edge portion and disposed to extend from the slot and shaped to form a sipe in a tire, and at least one structure including at least one tab portion attached to said edge portion and received in the indent and at least one member wedging said tab portion in a locked position in the indent.

17. A combination according to claim 16 wherein the mold is an engraved mold.

18. A combination according to claim 16 wherein the indent has a floor and at least one side wall which slopes so as to overhang a portion of said floor, said tab portion received partially under said side wall so that said side wall overhangs a portion of said tab portion.

19. A combination according to claim 16 comprising a pair of said tab portions said structure further including a housing fixedly received in the indent, said wedge member received in said housing and spreading apart said pair of tab portions into a locking relation with said housing.

20. A method for attaching a sipe-forming blade in a slot in a tire mold, the method comprising (1) selecting the blade to have at least one tab portion extending from an edge thereof and at least one wedge member, (2) forming at least one indent in the slot, (3) inserting the blade into the slot so that the tab portion and the wedge member are received in the indent, and (4) applying force to the blade to effect movement of the wedge member into a position relative to the tab portion to wedge the tab portion into a locked position in the indent.

21. A method according to claim 20 further comprising laser or water jet cutting the blade.

22. A method according to claim 20 further comprising engraving the tire mold.

* * * * *